March 17, 1931.  G. KAPP ET AL  1,797,091
LICENSE PLATE CLAMP
Filed April 12, 1929
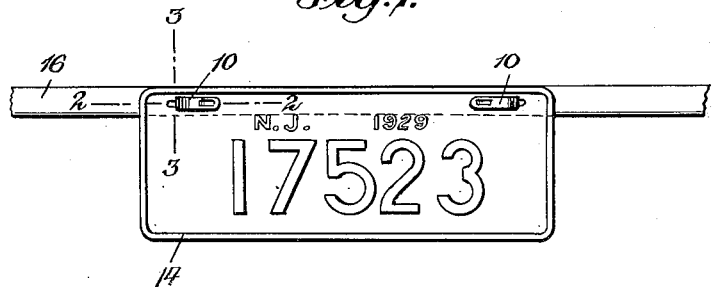
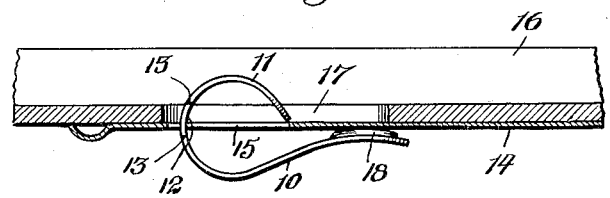
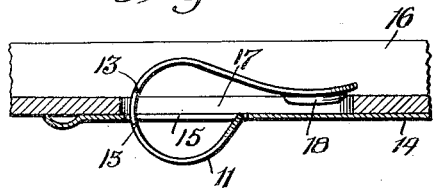
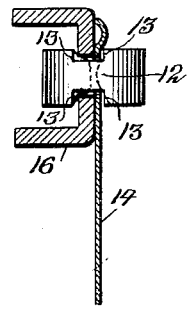
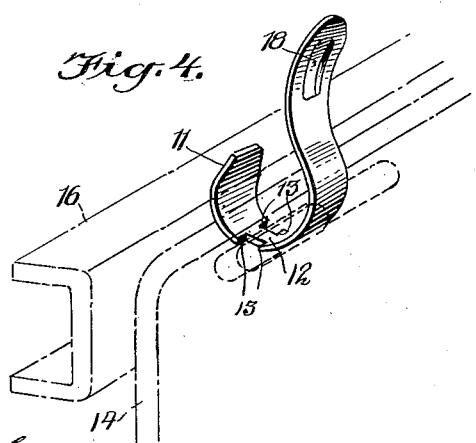
WITNESSES
INVENTORS
George Kapp,
James T. Dillon
BY
ATTORNEYS.

Patented Mar. 17, 1931

1,797,091

UNITED STATES PATENT OFFICE

GEORGE KAPP, OF PORT CHESTER, AND JAMES T. DILLON, OF BEDFORD, NEW YORK, ASSIGNORS TO DILCAP CORPORATION, OF PORT CHESTER, NEW YORK, A CORPORATION OF NEW YORK

LICENSE-PLATE CLAMP

Application filed April 12, 1929. Serial No. 354,649.

This invention relates to a fastener or clamp for securing a plate, such as an automobile license plate to a supporting part, bracket or attachment therefor.

The principal object of the invention is the provision of a novel form of fastener or clamp adapted to be used for quickly attaching and detaching a plate of the indicated character, one which is extremely simple of construction, and one which is inexpensive of manufacture.

The nature of the invention and its distinguishing features and advantages will appear when the following specification is read in connection with the accompanying drawing, in which Figure 1 is a view showing a license plate secured to a supporting part with fasteners or clamps of the present invention.

Fig. 2 is an enlarged sectional view taken on the line 2—2 of Fig. 1.

Fig. 3 is an enlarged sectional view taken on the line 3—3 of Fig. 1.

Fig. 4 is a view illustrating the manner in which a fastener or clamp is employed.

Fig. 5 is a view similar to Fig. 2 showing a fastener in use in a reversed position.

The fastener or clamp of the present invention is made of metal and preferably consists of a single piece of flat spring steel formed to provide cooperative clamping members 10 and 11 suitably united as by a loop 12. The member 10 is longer than the member 11. Each of the members 10 and 11 is curved, said members curving toward each other. The members 10 and 11 are set flatwise with respect to each other. The opposite edges of the loop 12 are notched to present pairs of shoulders 13. It is to be understood that any suitable number of fasteners or clamps may be used for the purpose of securing a plate to a supporting part or bracket, and in the present instance two fasteners or clamps are used.

In the drawing there is shown an automobile license plate 14 having an opening or slot 15 near each end at the upper edge thereof. There is also shown a supporting part, bracket or appurtenance 16 which will be fixedly secured to a part of the automobile. The said part 16 has slots 17 therein with which the openings or slots 15 in the plate 14 register. One fastener or clamp is used in conjunction with each plate opening or slot 15 and slot 17 in the part 16. The fastener or clamp is employed by passing the member 11 flatwise through the related opening 15 and slot 17, whereupon the fastener is then rocked substantially 90°, thereby bringing the members 10 and 11 into clamping engagement with the opposite faces of the plate 14, and edges of both the plate 14 and the part 16, bounding the opening 15 and slot 17 between the shoulders 13, as shown most clearly in Figs. 2 and 3. The extremity of the member 11 will also be in contact with the upper and lower walls of the slot 17. In this manner the fastener or clamp will be held against unintentional turning movement, and will therefore be held against displacement. Each fastener or clamp may be readily detached in an obvious manner.

In order that each fastener or clamp will be effective for the intended purpose if employed in a manner reverse from that shown in Figs. 1 to 3 inclusive, the longer member 10 is provided with a depressed region so as to present a shoulder or projection 18. This shoulder or projection 18 will be received in the slot 17 of the part 16, when the fastener or clamp is in a reversed position, to prevent unintentional turning movement of the fastener or clamp, as shown in Fig. 5.

We claim:

1. A plate fastener comprising a pair of cooperative flat and flexible clamping members united by a loop, said members being curved and set flatwise with respect to each other, the opposite edges of said loop having notches to present shoulders, to receive therebetween edges bounding openings in a plate and supporting bracket, and one of said members having a projection receivable in the opening in said bracket, for the purpose of preventing the displacement of the fastener, while said members are engaged with said plate and supporting bracket to fasten them together.

2. The combination with a plate and bracket, the plate having openings and the bracket having slots, of separate fasteners each comprising a pair of cooperating flat spring clamping members suitably united, and shoulders between the ends of said members, each fastener passing through one of said openings and one of said slots, said members respectively being in clamping engagement with the plate and bracket, the shoulders being engaged with edges bounding the related opening and slot, and one of said members projecting into said slot.

3. A fastener constructed of a single piece of spring material to provide a pair of co-operative clamping members united by a loop, and one of said members being longer than the other, the opposite edges of the loop having notches to present shoulders to receive therebetween edges bounding openings in a plate and its supporting bracket, and the longer of said members having a projection receivable in the opening in said bracket, for the purpose of preventing the displacement of the fastener, while said members are engaged with said plate and bracket to fasten them together.

4. For fastening a plate having an opening therein to a suitable support also having an opening therein in registry with the first opening, a fastener comprising co-operative flexible clamping members united by a loop and set flatwise opposite each other, and also curved toward each other, one member being shorter than the other to enable the insertion of one member into the openings in the plate and support, said loop having a notch therein to present shoulders to receive therebetween edges bounding said openings by turning the fastener while positioned in the openings, and also to bring said members into clamping engagement with the plate and support to fasten the plate to the support.

GEORGE KAPP.
JAMES T. DILLON.